United States Patent
Bodor

[11] 3,884,905
[45] May 20, 1975

[54] PRO-DRUG FORMS OF DIGOXIN
[75] Inventor: Nicolae S. Bodor, Lawrence, Kans.
[73] Assignee: INTREX Research Corporation, Lawrence, Kans.
[22] Filed: May 2, 1974
[21] Appl. No.: 466,241

[52] U.S. Cl. .............................. 260/210.5; 424/182
[51] Int. Cl.² ...................................... C07C 173/02
[58] Field of Search ................................ 260/210.5

[56] References Cited
UNITED STATES PATENTS
3,696,091  10/1972  Eberlein et al. ................. 260/210.5
3,804,825  4/1974   Lösel et al. ...................... 260/210.5

Primary Examiner—Johnnie R. Brown
Assistant Examiner—Gary B. Owens
Attorney, Agent, or Firm—Charles N. Blitzer

[57] ABSTRACT

There is provided, a novel pro-drug form of digoxin having the following formula:

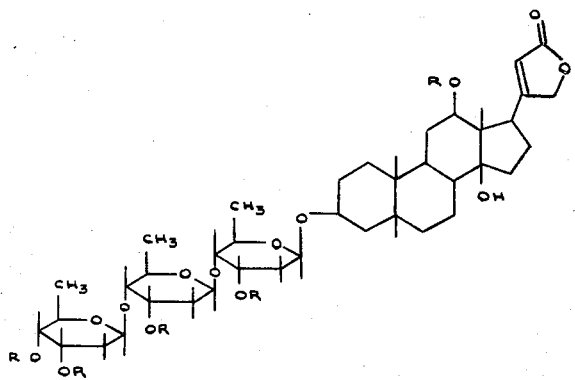

wherein R represents a member selected from among a hydrogen atom, a picolinoyl group, a nicotinoyl group, and an iso-nicotinoyl group, with the proviso that at least one of said R must represent a picolinoyl group, a nicotinoyl group, or an iso-nicotinoyl group. These novel compounds will be cleaved in the bloodstream, delivering digoxin. Due to their higher solubility and better absorption characteristics, they permit, a higher and more reproducible level of digoxin bio-availability to be attained than that which could be attained if digoxin per se was administered.

7 Claims, No Drawings

PRO-DRUG FORMS OF DIGOXIN

BACKGROUND OF THE INVENTION

1. Field of the Invention

The present invention is directed to novel pro-drug forms of digoxin and namely, the mono- through penta-picolinoyl, nicotinoyl, and iso-nicotinoyl derivatives thereof.

As employed in this application, the term "Pro-Drug" denotes an art recognized expression, indicating that a derivative of a proven, known drug has been prepared, which after administration in suitable dosage form, will "cleave" in the body, thus releasing the basic drug. The higher solubility and/or better absorption characteristics of the pro-drug, as well as by protecting in the pro-drug the active sites of the molecule against undesired metabolic pathways will permit such drug to obtain a higher and more reproducible bio-availability level than that which could be obtained if the basic drug per se were administered. Thus, in the instant application, the derivatives described above will permit digoxin to attain a superior bio-availability level in the bloodstream, than that which could be obtained if digoxin were administered per se.

2. Description of the Prior Art

Digoxin is a cardiotonic drug, used in the field of medicine to achieve an increase in the force of myocardial contraction. Basically, digoxin is a condution system depressant, which acts in such a manner as to decrease cardiac rate.

The structural formula for digoxin is set out below and conventionally speaking, the dose administered to a patient (orally) to achieve digitalization is approximately 1.5mg and thereafter, a maintenance dose of approximately 0.5mg is required.

stricted its medicinal value. On the other hand, the therapeutic and toxic dose of digoxin are extremely close and consequently, the difference in the absorption of digoxin (due to its low solubility) and further due to varying rates of absorption in varying individuals, can cause toxic effects.

To date, numerous efforts have been directed to obtaining a derivative of digoxin exhibiting favorable physical properties, which would permit such derivatives to be administered for the purpose of enabling digoxin to be released in the bloodstream at a high bioavailable level, without exhibiting accompanying toxic side effects. A review of the literature respective of these derivatives follows.

Digoxin contains six hydroxy groups, five of which are secondary and one of which is tertiary. The reactivity of the hydroxy groups is as follows:

$$OH_{4'''} \cong OH_{3''''} > OH_{12} \approx OH_{3''} > OH_{3'}.$$

On the other hand, the digoxin molecule contains a base-sensitive lactone ring, which in basic solution or solutions, will undergo irreversible rearrangement. Strong acids, however split off the digitoxose moieties Thus, the most reactive part of the molecule is the 3''' and 4''' hydroxy groups. A number of derivatives have been prepared by reacting the hydroxy groups in digoxin as outlined below.

U.S. Pat. No. 3,538,078, Belgian Pat. No. 752,284 and German Pat. No. 1,961,034 have disclosed digoxin ether derivatives of the 3''', 4'''-mono-ether type, the di-ethers, and the mono-ethers-monoacylates. Specifically, the 3'''-monoethyl ether, the 3'''-monoethyl ether, the dimethyl ether, the monoacetyl-monoethyl ether, the monoformyl-monomethyl ether, the monoethoxyacetyl-monomethyl ether, the 4'''-

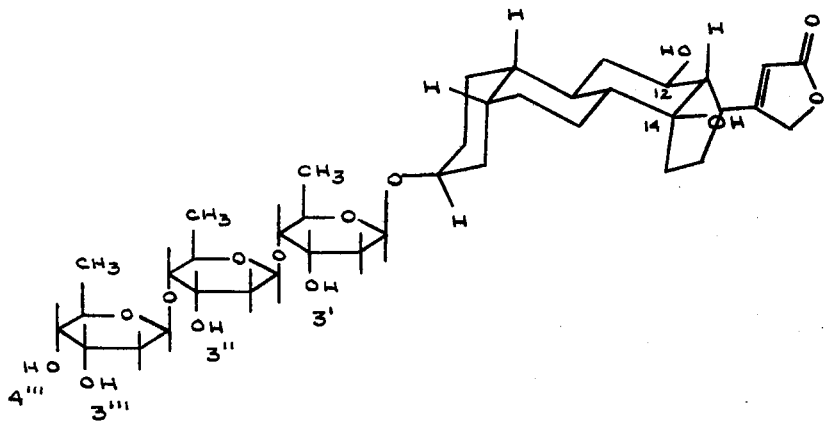

Digoxin is used in the treatment of cardiac failure, atrial fibrillation and flutter, paroxysinal tachycardia, cardiac insufficiency, etc. It has the advantage as compared to digitoxin, in that its onset of action is quite more rapid and further, its duration of action is shorter. It has an additional advantage in that in the event of an overdose, the symptoms associated therewith are more readily dissipated; however, digoxin is not as completely absorbed from the gastro-intestinal tract as digitoxin. Essentially, digoxin is absorbed only to the extent of about 50 to 70%. Its solubility per ml. of 0.1N HCl is about 78mcg. at 25°C.

The low solubility of digoxin in water and in other various solvents (e.g. 0.1N HCl) has heretofore remonomethyl ether, and the 4'''-monoethyl ether have been disclosed.

Belgian Pat. No. 672,307 discloses digoxin acylates, such as the tetraformate (4''', 3''', 3'', and 3').

Belgian Pat. No. 750,875 and German Pat. No. 2,019,967 disclose digoxin derivatives of the pentanitrate and mono-di and -tetranitrate type.

Belgian Pat. No. 763,817 discloses digoxin derivatives of the 3''' and 4'''-monoacylate type, employing an alkyl-ortho-acetate. The same compounds are disclosed as being derived from the separation of same out of a mixture of glucosides in French Pat. No. 1,568,075.

Other 3'''-monoacylates of the formula:

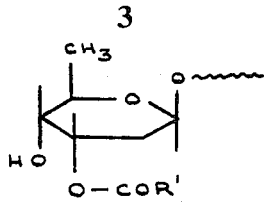

are known wherein R' represents a substituted alkyl group of from 1 to 4 carbon atoms, whose substitutents are either a halogen atom, an aryl group (preferably, a phenyl group) or a cycloalkyl group; a straight alkyl group of from two to twelve carbon atoms, or a cycloalkyl group of from 3 to 8 carbon atoms. See, German Pat. No. 2,101,595.

U.S. Pat. No. 3,514,441 discloses 12-monoacylates of digoxin, obtained by protecting the 3''' and 4''' hydroxy groups by forming a 3''' or 4'''-carbonate or a 3''',4'''-cyclocarbonate. The aforementioned protecting groups can easily be removed, selectively, following acylation of the $C_{12}$ hydroxy group.

A number of digoxin derivatives have been prepared in the prior art by effecting structural changes of the steroid part, such as the digoxin 15', 16'-diacetates. For instance, see Belgian Pat. No. 749,680.

Belgian Pat. No. 751,768 discloses the 22-n-butoxy; the 22-fluoro; and the 22-methoxy forms of digoxin.

German Pat. No. 2,052,634 discloses derivatives substituted on the lactone ring of digoxin by a group of the $-HC=C(R_1, R_2)$ type, wherein $R_1$ represents a CN group, a COOH group, and a carboalkoxy group, and wherein $R_2$ represents a hydrogen atom, a fluorine atom, a chlorine atom, an alkyl group, an alkoxy group, or a CN group.

Dutch Pat. No. 66-01041 discloses 12-dehydro digitoxin and Swiss Pat. No. 413,812 discloses dihydrodigoxin.

Finally, U.S. Pat. No. 3,696,091 discloses 22-substituted (F,Cl, alkoxy)digoxin ether and acylates.

Since applicant's main objective concerned the development of transient digoxin derivatives having higher water solubility and absorption characteristics (higher bio-availability levels), applicant was extremely interested in only the activity and physical properties of the simple reported digoxin derivatives, i.e. the ethers and acylates.

While all reported derivatives, thus prepared in the prior art, are claimed to exhibit superior therapeutic and/or physico-chemical properties than digoxin per se, this is not exactly true. For instance, it is still questionable that digoxin ethers are hydrolyzed enzymatically. Recent reports seem to indicate that 4'''-methyldigoxin is actually demethylated in man. For instance, reference is made to the articles by H. Rennekamp, C. H. Rennekamp, U. Abshagen, K. V. Bergmann, and N. Rietbrock, Arch. Pharmacol, 273, 172 (1972) and N. Reitbrock, C. H. Rennekamp, H. Rennekamp, K. V. Bergmann, and U. Abshagen ibid, 272, 450 (1972) respectively.

However, more recent studies conclude that "beta-methyldigoxin is very resistant to degradation by animal enzymes. Methyl digoxin is a new glycoside, but not a form of digoxin which exhibits improved absorption, i.e., bio-availability. The metabolism of digoxin appears to be inhibited by substituting the beta-hydroxy group of the third digitoxose molecule." On the other hand, it is generally accepted that acetyl digoxin is rapidly hydrolyzed giving rise to digoxin. See, G. Haberland, Arzneimittel Forsch, 15, 481 (1965); K. Buchtela, U. Drexler, H. Hackl, N. Konigstein, and O. Schlager, ibid.18, 295, (1968); and W. Forster and S. Schulzeck, Biochem. Pharmacol.,17, 489 (1968).

This is probably true for all the digoxin acylates. To date, none of the reported digoxin ethers or acylates has, however, exhibited a substantial increase in water solubility when compared to digoxin per se. It has been accepted that acetyl groups facilitate penetration of the intestinal wall and that they are split off in the body, giving rise to digoxin.

SUMMARY OF THE INVENTION

It is an object of the present invention to provide new derivatives of digoxin for administration to warm-blooded animals and more particularly, it is the primary object of the present invention to provide new pro-drug forms of digoxin, which when introduced into the stomach of a warm-blooded animal will exhibit superior solubilization therein, (as evidenced by the solubility of these forms in 0.1N HCl) to the extent that superior bio-availability of digoxin, following "cleavage" of the derivative can be achieved.

Accordingly, this invention is concerned with the discovery of new digoxin derivatives and specifically, digoxin derivatives of the picolinate, nicotinate, and iso-nicotinate type (mono- through penta-) as set forth in the following formula:

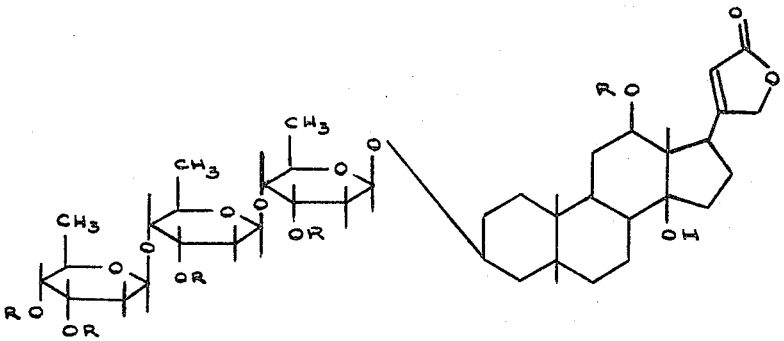

wherein R represents a member selected from the group consisting of a hydrogen atom, a picolinoyl group, a nicotinoyl group, and an iso-nicotinoyl, with the proviso that at least one of said R must represent a member selected from the group consisting of a picolinoyl group, a nicotinoyl group, and an isonicotinoyl group. In the above formula, when R is a member other than hydrogen, all of said Rs must be the same member (i.e. picolinoyl, nicotinoyl, or isonicotinoyl).

From among the specie compounds encompassed within the above generic formula, the most preferred compounds are those of the penta-picolinate, pentanicotinate, and penta-iso-nicotinates, as the applicant has observed that while all compounds encompassed within the above generic formula exhibit enhanced solubility over digoxin per se, these compounds are the most preferred as they have been observed to exhibit the best solubility.

DETAILED DESCRIPTION OF THE INVENTION

The digoxin derivatives of this invention can be prepared in a simple step-wise manner. For example, under the conditions of room temperature and standard pressure, digoxin is initially dissolved in a suitable solvent, such as pyridine and subsequently, the corresponding picolinic, nicotinic, or iso-nicotinic anhydride is added thereto and the overall mixture is permitted to stand, following stirring, at room temperature for 5 days. Subsequently, the reaction mixture is introduced into a suitable amount of water with stirring. A fine precipitate will be observed, and such precipitate is filtered off, washed five times with water and then dried over calcium chloride. At this point in time, the crude digoxin derivative has been obtained and subsequently, this crude material is dissolved in a suitable amount of chloroform/methanol mixture, chromatographed, afterwhich the solvent is evaporated off to dryness to thus yield the final pure digoxin derivative.

In an alternative preparatory embodiment, these compounds can be prepared in accordance with the step-wise procedure recited above, substituting the corresponding picolinoyl, nicotinoyl, or iso-nicotinoyl chloride for the anhydride and employing as the reaction solvent, chloroform or any other suitable solvent (s.a.: $CH_2Cl_2$, $CCl_4$, THF (tetrahydrofuran)), the reaction mixture being refluxed at room temperature for a period of from 1 to 2 hours and said reaction being carried out at room temperature and standard pressure. The mono- through tetra- derivatives can be obtained by using conventional protective groups for the earlier described hydroxy groups.

The digoxin derivatives of this invention are normally administered orally, for instance, in the form of a pharmaceutically acceptable tablet comprising the particular digoxin derivative and a pharmaceutically acceptable inert diluent.

The pharmaceutical dose required for an individual being administered a compound of this invention, will naturally vary, depending upon the needs of the individual; however, as a basic guideline, the dose required for digitalization will range from approximately 2.0 to 2.5mg. and the maintenance dose will range from approximately 0.25 to 1.0mg, respectively.

A more thorough understanding of the present invention will be gained from a review of the following example, which example is merely intended to be illustrative and not limitative of the present invention.

EXAMPLE I

DIGOXIN PENTANICOTINATE 7.8g of digoxin (0.01mol) was dissolved in 155ml of dry pyridine. Thereafter, nicotinic anhydride was added thereto in the amount of 30g (0.13mol) and the resulting mixture was stirred at ropom temperature for 5 days. The reaction mixture was then poured into a vessel containing 2200ml of water, with stirring. The fine precipitate observed, was then filtered off, washed five times with 60ml of water and then dried over calcium chloride. At this point, 13.0g of the crude digoxin pentanicotinate was obtained, which crude material was then dissolved in 780ml of chloroform/methanol (95:5) admixture. This mixture was then chromatographed over Florisil. About 1500 to 1600 ml of solution was collected, the solvent was evaporated to dryness, and 12.7 g of pure digoxin pentanicotinate was thus obtained.

The yield of the final pure produce was 98% $C_{71}H_{79}O_{19}N_5$, which product has a molecular weight of 1306.38. Analysis Calculated: C, 65.27; H, 6.10; and N, 5.36. Found: C, 65.02; H, 5.81, and N, 5.27. When obtained, the pure compound was dissolved in 0.1N HCl, and a solubility value of 12.8 mg/ml was determined. The solubility value for digoxin in the same medium is about 78 mcg./ml.

Other compounds falling within the generic formula describing the compounds of this invention also exhibit similar solubility as compared to digoxin pentanicotinate and these compounds can be prepared in the manner described earlier.

It can be appreciated that at a pH of more than 1.0 the compounds of this invention might become somewhat less soluble; however, should this occur, the same can be overcome by converting the particular compound in question to its proton salt (HCl).

In summary then, specific novel digoxin derivatives have been prepared, which owing to their extreme solubility, can be expected to provide enhanced digoxin bio-availability when cleaved following absorption, when compared to digoxin per se.

As stated earlier, the pro-drug forms of this invention are suitably administered in oral dosage form, such as by tablet or capsule, by combining the same in a therapeutic amount with any oral pharmaceutically acceptable inert carrer, such as lactose, starch (pharmaceutical grade), dicalcium phosphate, calcium sulfate, kaolin, mannitol, and powdered sugar. In addition, when required, suitable binders, lubricants, disintegrating agents, and coloring agents can also be added. Typical binders include starch, gelatin, sugars, such as sucrose, molasses, and lactose, natural and synthetic gums such as acacia, sodium alginate, extract of Irish moss, carboxymethylcellulose, methylcellulose, and polyvinylpyrrolidone, polyethylene glycol, ethylcellulose and waxes. Typical lubricants for use in these dosage forms can include, without limitation, boric acid, sodium benzoate, sodium acetate, sodium chloride, leucine, and polyethylene glycol. Suitable disintegrators can include, without limitation, starch, methylcellulose, agar, bentonite, cellulose and wood products, alginic acid, guar gum, citris pulp, carboxymethylcellulose, and sodium lauryl sulfate. If desired, a conventionally pharmaceutically acceptable dye can be incorporated into the dosage unit form, e.g., any of the standard FD&C dyes.

Any skilled artisan can prepare these oral dosage forms by simply referring to the oral dosage form preparatory procedure outlined in "REMINGTON'S PHARMACEUTICAL SCIENCES," Fourteenth Edition (1970), pages 1659 through 1698 inclusive.

From the foregoing description, one skilled in the art can easily ascertain the essential characteristics of this invention, and without departing from the spirit and scope thereof, can make various changes and/or modifications to the invention for adapting it to various usages and conditions. As such, such changes and modifications are properly, equitably and intended to be, within the full range of equivalence of the following claims.

What I claim:

1. A digoxin compound of the formula:

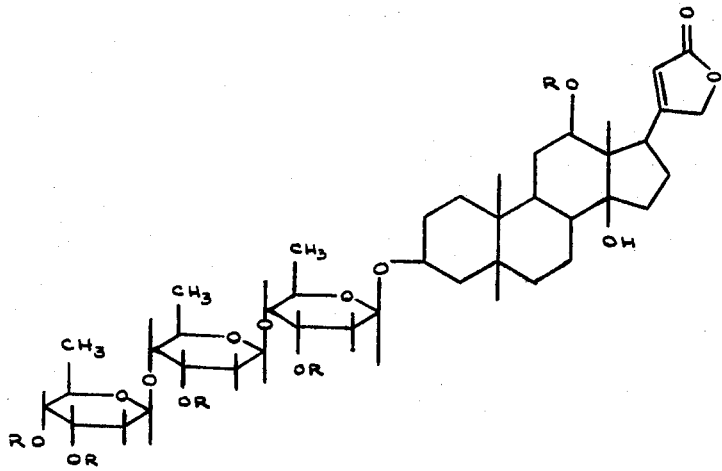

wherein R represents a member selected from the group consisting of a hydrogen atom, picolinoly, nicotinoyl, and iso-nicotinoyl, with the proviso that at least one of said R must represent a member selected from the group consisting of picolinoyl, nicotinoyl, or iso-nicotinoyl, and wherein, when R is other than hydrogen, all of said R's must be picolinoyl, nicotinoyl or iso-nicotinoyl.

2. The compound of claim 1, wherein R represents nicotinoyl.

3. The compound of claim 1, wherein R represents picolinoyl.

4. The compound of claim 1, wherein R represents iso-nicotinoyl.

5. The compound of claim 1:
Digoxin Pentanicotinate.

6. The compound of claim 1:
Digoxin Penta-iso-nicotinate.

7. The compound of claim 1:
Digoxin Pentapicolinate.

* * * * *

UNITED STATES PATENT OFFICE
CERTIFICATE OF CORRECTION

Patent No. 3,884,905            Dated May 20, 1975

Inventor(s) Nicolae S. Bodor

It is certified that error appears in the above-identified patent and that said Letters Patent are hereby corrected as shown below:

IN THE ASSIGNEE'S NAME

Kindly amend the assignee of the above-identified patent to read:

-- INTERx Research Corporation --.

Signed and Sealed this nineteenth Day of August 1975

[SEAL]

Attest:

RUTH C. MASON
Attesting Officer

C. MARSHALL DANN
Commissioner of Patents and Trademarks